United States Patent Office

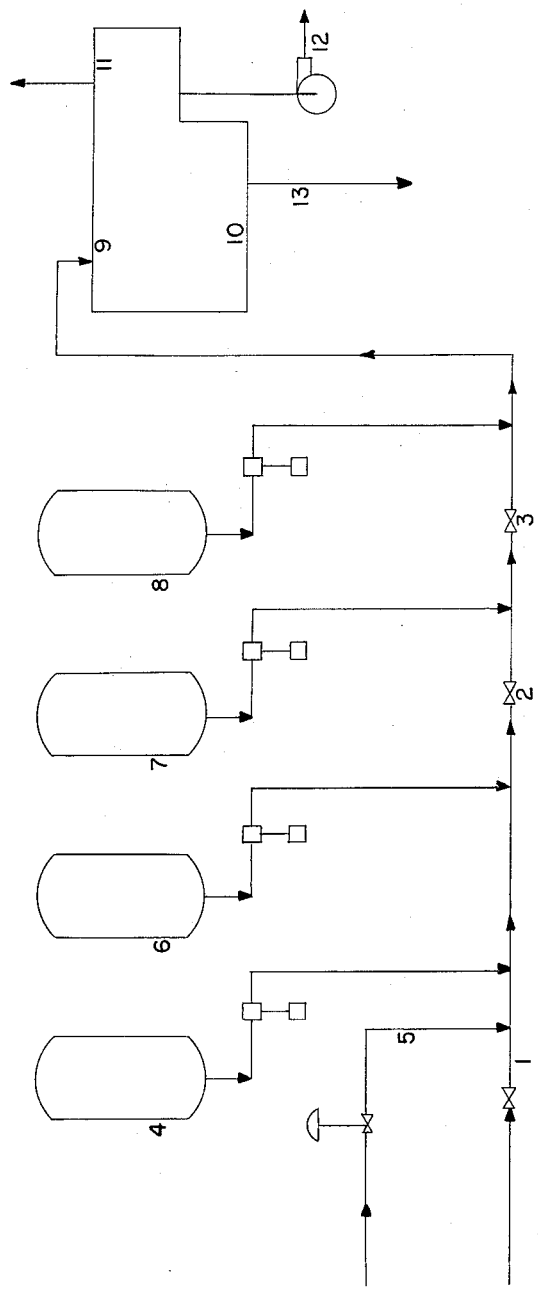
INVENTOR
Walter B. Howard
Herbert H. Nelson
Raymond Rosenberg 2,725,985

Patented Dec. 6, 1955

2,725,985

FLOTATION OF CARBON BLACK

Walter B. Howard, Texas City, Herbert H. Nelson, Dickinson, and Raymond Rosenberg, Texas City, Tex., assignors to Monsanto Chemical Company, St. Louis, Mo., a corporation of Delaware Application April 6, 1953, Serial No. 347,088

2 Claims. (Cl. 210—53)

This invention relates to a method of treating water for the removal of impurities and more particularly to a process for treatment of water to remove small quantities of dispersed carbon black therefrom.

In a number of processes in the chemical industry, particularly those involving hydrocarbon combustion, pyrolysis, or the like, water employed for quenching hot gases, for example, becomes contaminated with finely divided particles of carbon black or soot. Processes have been developed whereby the greater proportion of such suspended carbon can be removed and the water rendered suitable for re-use. The most efficient of the known processes for this purpose, however, do not generally succeed in reducing the carbon content to less than 50 p. p. m. (50 parts of carbon per million parts of water).

In the course of recycling this treated water it becomes necessary, in order to maintain the required control on the dissolved solids content of the process water, to continuously remove a so-called "blow-down" stream to waste. Where these waste effluents must be emptied into public streams such as bays, rivers, etc., the presence of even such small quantities as 50 p. p. m. of soot constitutes a serious pollution problem and it becomes necessary to free the waste stream from substantially all dispersed carbon particles before emptying it into these public bodies of water.

Various methods have been devised for effecting removal of soot from water, among them processes involving coagulation or precipitation, flotation methods, and combinations of both of these techniques. However, known processes fall short of desired performance in many cases.

Accordingly, it is an object of the invention to provide a novel process for treating water to remove small quantities of soot therefrom. By "small" quantities of soot are meant, throughout this specification and the appended claims, amounts in the range from about 5 to about 500 p. p. m.

It is a further object of the invention to provide a novel flotation process for treating water to remove small quantities of soot therefrom which is both practical and economical and which permits continuous, efficient operation with a minimum hold-up time in processing.

Other objects and advantages will become apparent from the following description of the invention.

According to the invention, water containing small quantities of dispersed carbon or soot may be clarified by injecting gas under pressure into said water, treating it, while still under pressure, with a base for pH adjustment, if necessary, and a foaming agent, releasing the pressure, adding a coagulant or flocculating agent, and conducting the mixture to a flotation chamber. In the flotation chamber, the soot-foam-floc layer formed on the surface of the water is removed and the clarified water is recovered.

The invention will be more clearly understood from the following description of a specific embodiment of the process read with reference to the attached diagrammatic flowsheet.

Water to be treated, i. e., "sooty" water containing 50 p. p. m. of carbon and at a temperature of about 90° F., is introduced at a rate of 250 gallons/minute into the line 1 which contains the restricting valves 2 and 3, to provide a total pressure drop through the line of approximately 40 p. s. i. The pH of the water is adjusted to about 10 by the addition of a 25% solution of sodium hydroxide from the tank 4 and nitrogen is injected into the stream through line 5 at such a rate that the water is essentially saturated with nitrogen at the injection pressure.

As the water flows through the line about 0.02 g. of methyl cellulose, 0.5 g. of diesel oil, and 0.26 g. of ferric sulfate per gallon of water are introduced from the tanks 6, 7, and 8 under line pressure. The resulting mixture is passed from the line 1 to a clarifier 9 which is maintained at atmospheric pressure. Here the water flows over a weir into a flotation chamber 10 where it is distributed evenly over the entire area of the chamber. The release in pressure causes the flocculated soot to float to the surface as a stable foam. The soot-foam-floc layer is continuously removed by flight scrapers into a recovery basin 11 at the opposite end of the clarifier from which it is pumped to a waste disposal pit through the line 12 for burning, etc. The clarified water with a pH of approximately 8 and substantially free of carbon particles is continuously removed by means of the outlet tube 13 and passed into the sewer effluent system.

In carrying out the novel process of the invention, the specific additive agents, quantities of these agents, and conditions under which they are added set forth in the preceding description are subject to substantial variation. For example, the use of a collecting agent such as kerosene, diesel fuel oil, or other light relatively inexpensive oils, is not an essential step in the process. Effective separation of the soot from water may be achieved without it, but the general overall efficiency of the process is increased by employing an oil along with the other additives. When such a collector is added, the soot particles appear to be more cohesive and tend to float more readily. Also, the soot-foam-floc layer formed is tougher and more resistant to separation when subjected to the action of the flight scrapers. The quantity of oil employed is not a critical factor. The minimum quantity preferred is that which represents a slight excess over that amount which is miscible with water, i. e., as indicated in the example above, from about 0.5 g.–0.8 g. per gallon of water treated. Larger quantities may be employed but too great an excess should be avoided since it not only presents the problem of disposal of excess oil and is more expensive, but also because it adversely affects the character of the soot-foam-floc layer.

The order of addition of the treating agents has some effect on the efficiency of the process. The order of addition of the collector, if one is used, and foaming agent is not important, but, for best results, the flocculator must be added after the other two agents and just prior to the flotation step. If the flocculator is added before the water is pumped through the mixing valves, the agitation or mixing destroys the floc, and, either no coagulation or flotation is achieved, or the foam produced is so much less stable that the flocculated soot settles rather rapidly instead of floating in the clarifier.

The only limitations on the pressure used in the treating step of the process are those set by practical considerations. The process may be operated at pressures as low as 10 p. s. i. g. if a more soluble gas is employed or if lower efficiencies can be tolerated, or at pressures as high as 100 p. s. i. g., if desired. Preferably, however, pressures are maintained in the range from about 30 to about 50 p. s. i. g. Temperature is not a critical variable. Successful operation is achieved at atmospheric temperatures (40° F.– 90° F.). However, as might be expected, better coagulation and flotation are obtained when the water is hot (140–160° F.). In plant operations, therefore, optimum temperature would be determined primarily by economic considerations.

In addition to nitrogen, air or any other inert gas may be employed for flotation purposes.

The pH of the water may require adjustment initially so that the final pH of the treated water is in the range from 4 to 10. The optimum flocculating effect is achieved at a pH of 7 to 8; hence the final pH of the water is preferably maintained in that range. Any acid effect resulting from water hydrolysis of the flocculating agent must, therefore, be taken into account and counteracted by the addition of a base initially. Hence, it is usually necessary to adjust the pH of the incoming water by adding a small quantity of base. Any of the common bases such as the sodium hydroxide mentioned in the example, ammonium hydroxide, or other alkali metal hydroxides, etc., are suitable.

While methyl cellulose is mentioned as the foaming agent, the invention is not limited to this agent. Other similar agents such as the starches, gums, dextrins, etc., commonly employed for producing foaming are also suitable. The amount of foaming agent used may vary from about 0.01 to about 0.1 gram per gallon of water to be treated. Preferably, for optimum effect, from about 0.02 to 0.04 gram per gallon of sooty water is used. If too great an excess of foaming agent is employed the soot-foam-floc layer becomes too frothy, unmanageable, and hard to pump. However, such difficulty can be easily overcome by the addition of a small amount of an antifoaming agent such as n-octyl alcohol to the soot sludge collected in the soot recovery basin.

Other flocculating agents such as ferric chloride, aluminum sulfate, potassium aluminum sulfate, and the like, may be used in addition to the ferric sulfate shown in the example. Amounts ranging from 0.06–2.0 g. of flocculator per gallon of water to be treated may be added depending upon the amount of dispersed carbon in the water. However, for water containing 100 p. p. m. of dispersed carbon or less, amounts ranging from about 0.2 to about 0.3 g. per gallon are preferred since they provide for most efficient operation.

When ferric sulfate or ferric chloride are used as flocculators, precaution should be taken against their corrosive effect on equipment. Tanks, lines, valves, etc., employed should be fabricated of some resistant material such as lead, porcelain, etc., or should be glass or plastic-lined to prevent the severe corrosion which occurs.

What is claimed is:

1. A process for clarifying water containing small quantities of dispersed carbon which comprises injecting an inert gas under a pressure of 10 to 100 pounds per square inch gauge into said water, treating said water, while still under pressure, by adding thereto for every gallon of said water, from about 0.5 g. to 0.8 g. of diesel oil, from about 0.01 g. to 0.1 g. of methyl cellulose, a quantity of an alkali metal hydroxide such that the pH of the water after the addition of the flocculating agent lies between 7 and 8, from about 0.06 g. to 2.0 g. of ferric sulfate as a flocculating agent, then depressurizing the resulting mixture whereby a soot-foam-floc layer is formed on the surface of the water, removing said soot-foam-floc layer, and recovering the clarified water substantially free of carbon.

2. A process for clarifying water containing small quantities of dispersed carbon which comprises injecting nitrogen under a pressure of approximately 40 pounds per square inch gauge into said water, treating said water while still under pressure by adding thereto for every gallon of said water, about 0.5 g. of diesel oil, about 0.02 g. of methyl cellulose, a quantity of sodium hydroxide such that the pH of the water after the addition of the flocculating agent lies between 7 and 8, about 0.26 g. of ferric sulfate as a flocculating agent, then depressurizing the resulting mixture whereby a soot-foam-floc layer is formed on the surface of the water, removing said soot-foam-floc layer, and recovering the clarified water substantially free of carbon.

References Cited in the file of this patent

UNITED STATES PATENTS

| Number | Name | Date |
|---|---|---|
| 1,388,868 | Jones et al. | Aug. 30, 1921 |
| 1,717,223 | Karlstrom | June 11, 1929 |
| 1,828,646 | Dantsizen | Oct. 20, 1931 |
| 1,982,129 | Wells et al. | Nov. 27, 1934 |
| 2,005,742 | Hines | June 25, 1935 |
| 2,219,781 | Lowe | Oct. 29, 1940 |
| 2,220,574 | Little et al. | Nov. 5, 1940 |
| 2,248,177 | Karlstrom | July 8, 1941 |
| 2,585,659 | Kilpatrick | Feb. 12, 1952 |